United States Patent
Christensen et al.

(10) Patent No.: US 10,400,855 B2
(45) Date of Patent: Sep. 3, 2019

(54) METHODS OF COUPLING A FLYWHEEL RIM AND A SHAFT

(71) Applicant: Northrop Grumman Innovation Systems, Inc., Plymouth, MN (US)

(72) Inventors: Brian R. Christensen, Willard, UT (US); Marcus A. Darais, Brigham City, UT (US)

(73) Assignee: Northrop Grumman Innovation Systems, Inc., Plymouth, MN (US)

( * ) Notice: Subject to any disclaimer, the term of this patent is extended or adjusted under 35 U.S.C. 154(b) by 302 days.

(21) Appl. No.: 15/261,337

(22) Filed: Sep. 9, 2016

(65) Prior Publication Data

US 2016/0377148 A1   Dec. 29, 2016

Related U.S. Application Data

(62) Division of application No. 13/762,030, filed on Feb. 7, 2013, now Pat. No. 9,464,685.

(51) Int. Cl.
*F16F 15/315*   (2006.01)
*F16F 15/305*   (2006.01)

(52) U.S. Cl.
CPC ........ *F16F 15/3153* (2013.01); *F16F 15/305* (2013.01); *F16F 2226/04* (2013.01); *F16F 2226/042* (2013.01); *F16F 2230/0005* (2013.01); *Y10T 74/2132* (2015.01)

(58) Field of Classification Search
CPC .. F16F 15/305; F16F 15/3153; F16F 2226/04; F16F 2226/042; F16F 2230/0005; Y10T 74/2132
See application file for complete search history.

(56) References Cited

U.S. PATENT DOCUMENTS

| | | |
|---|---|---|
| 4,036,080 A | 7/1977 | Friedericy et al. |
| 4,207,778 A | 6/1980 | Hatch |
| 4,285,251 A | 8/1981 | Swartout |
| 4,286,475 A | 9/1981 | Friedericy et al. |
| 4,341,001 A | 7/1982 | Swartout |
| 4,370,899 A | 2/1983 | Swartout |
| 4,458,400 A | 7/1984 | Friedericy et al. |
| 4,821,599 A | 4/1989 | Medlicott |
| 4,860,611 A | 8/1989 | Flanagan et al. |
| 4,991,462 A | 2/1991 | Breslich, Jr. et al. |
| 5,012,694 A | 5/1991 | McGrath |
| 5,562,014 A | 10/1996 | Waagepetersen |
| 5,566,588 A | 10/1996 | Bakholdin et al. |
| 5,628,232 A | 5/1997 | Bakholdin et al. |
| 5,695,584 A | 12/1997 | Gregoire |
| 5,732,603 A | 3/1998 | Swett et al. |
| 5,784,926 A | 7/1998 | Maass |

(Continued)

FOREIGN PATENT DOCUMENTS

KR   101009715   1/2011

*Primary Examiner* — Vishal I Patel (74) *Attorney, Agent, or Firm* — TraskBritt (57) ABSTRACT

A dome connector for a flywheel rim to shaft attachment is provided. The dome connector includes a helically wound composite band that extends from a first port to a second port. The helically wound composite band has a helical angle in relation to a line perpendicular to a center of axis of the dome connector. The helical angle is selected to at least in part achieve a desired stiffness in the dome connector.

20 Claims, 10 Drawing Sheets (56) References Cited

U.S. PATENT DOCUMENTS

| | | | |
|---|---|---|---|
| 5,816,114 A | * | 10/1998 | Gregoire ............... F16F 15/305 74/572.12 |
| 5,946,979 A | | 9/1999 | Waagepetersen |
| 6,014,911 A | | 1/2000 | Swett |
| 6,044,726 A | | 4/2000 | Blake |
| 6,299,718 B1 | | 10/2001 | Kimura et al. |
| 6,508,145 B1 | | 1/2003 | Gabrys |
| 6,817,266 B1 | | 11/2004 | Brackett |
| 7,080,573 B2 | | 7/2006 | Detore et al. |
| 7,263,912 B1 | | 9/2007 | Gabrys et al. |
| 2010/0018344 A1 | | 1/2010 | Spears et al. |
| 2010/0206126 A1 | | 8/2010 | Spears et al. |

* cited by examiner

METHODS OF COUPLING A FLYWHEEL RIM AND A SHAFT

CROSS-REFERENCE TO RELATED APPLICATION

This application is a divisional of U.S. patent application Ser. No. 13/762,030, filed Feb. 7, 2013, now U.S. Pat. No. 9,464,685, issued Oct. 11, 2016 the disclosure of which is hereby incorporated herein in its entirety by this reference.

BACKGROUND

Composite flywheels such as carbon composite flywheels are desired because they are strong while having a light weight (this is known as having a high specific strength). It is common for the composite flywheels to be connected to a metal shaft for the purpose of putting in or taking out kinetic energy from the flywheel. A common limiting factor for high-performance carbon composite flywheels, or other high-strength fiber composite flywheels, is the connection of the radially expanding (high strained) flywheel rim to the metal shaft, which expands much less (due to its smaller diameter). Typical composite/metal connections do not have sufficient stress/strain capabilities and connections, such as geometrically compliant metal spokes, which lead to dynamic instability. Moreover, connecting flat composite plates, with fibers oriented in a radial direction or near radial direction, form a shaft to rim connection, which produces unmanageable bond/fastener stresses. In addition, using very thick filament wound disks (with a majority of the fibers in the circumferential direction) results in unacceptable radial tensile stresses (across ply stresses) occurring in the hub.

For the reasons stated above and for other reasons stated below, which will become apparent to those skilled in the art upon reading and understanding the present disclosure, there is a need in the art for an effective, efficient and dynamically stable flywheel-to-shaft connection.

SUMMARY

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a dome connector for a flywheel rim to shaft attachment is provided. The dome connector includes a helically wound composite band that extends from a first port to a second port. The helically wound composite band has a helical angle in relation to a line perpendicular to a center of axis of the dome connector. The helical angle is selected to, at least in part, achieve a desired stiffness in the dome connector.

In another embodiment, a flywheel is provided. The flywheel includes a metal shaft, a composite flywheel rim and a dome connector. The dome connector couples the composite flywheel to the metal shaft. The dome connector includes a helically wound composite band that extends from a first port to a second port. The helically wound composite band has a helical angle in relation to a line perpendicular to a center of axis of the dome connector. A deflection characteristic of the dome connector generally matches a deflection characteristic of the flywheel rim.

In still another embodiment, a method of forming a coupling between a composite flywheel rim and a metal shaft is provided. The method includes: laying up a continuous band of composite fibers in a helical pattern from a first port to a second port to form a central passage with a first band layer; laying up subsequent layers with the continuous band of composite fibers over at least a portion of the first band layer to form a body; and curing the composite fibers to form a dome connector.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout the figures and the specification.

DETAILED DESCRIPTION

In the following detailed description, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a filament wound composite dome connector used for a flywheel rim to metal shaft connection. In embodiments, at least some of the filaments that make up the composite material that form the dome connector have winding patterns that are generically referred to herein as "helically wound." Helically wound patterns include polar, planar or other opening-to-opening wind patterns used to form the domes. Hence, the term "helically wound" is a generic term that is used throughout the specification and claims that includes polar, planar and other opening-to-opening wind patterns used to form the domes. The helically wound dome connectors are able to strain with the rim, yet maintain dynamic stiffness. The dome connectors also minimize the stress concentrations placed on an inside diameter of the flywheel rim, which can be significant in other types of rim-shaft connections, such as hubs, as known in the art. This reduction/elimination of stress concentrations is important since the energy storage capacity of a flywheel is directly related to the maximum stress in the flywheel rim. Moreover, the compliance of the dome connectors allow for a match between a deflection in the dome connector (dome connector deflection) and deflection in the flywheel rim (flywheel deflection) that is encountered during rotation of the flywheel. In embodiments, dome connector geometry, fiber material type, material fiber thickness and wind angle of the fiber are tailored to achieve the desired deflection or stiffness required for a specific design. As discussed below in detail, dome connectors may be wound in place with the flywheel rim or post installed by: bonding, a press fitting, shrink fitting and the like. Post installation of the dome connectors allows for the use of a single dome connector or two or more dome connectors per flywheel rim. Additionally, in a multi-dome connector configuration, the orientation of the domes relative to each other can be in a convex-convex, concave-concave or concave-convex configuration as also discussed below.

Figure 1A:
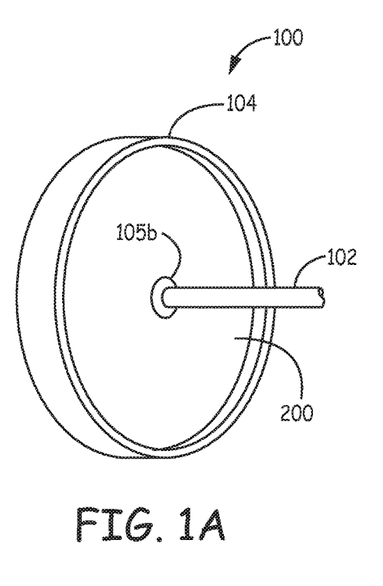
FIG. 1A is a front perspective view of a flywheel assembly of one embodiment of the present invention.
Figure 1B:
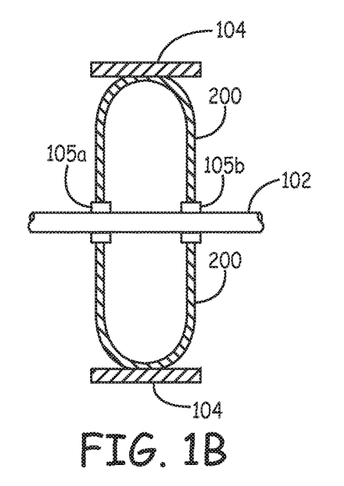
FIG. 1B is a cross-sectional side view of the flywheel assembly of FIG. 1A.
Figure 2A:
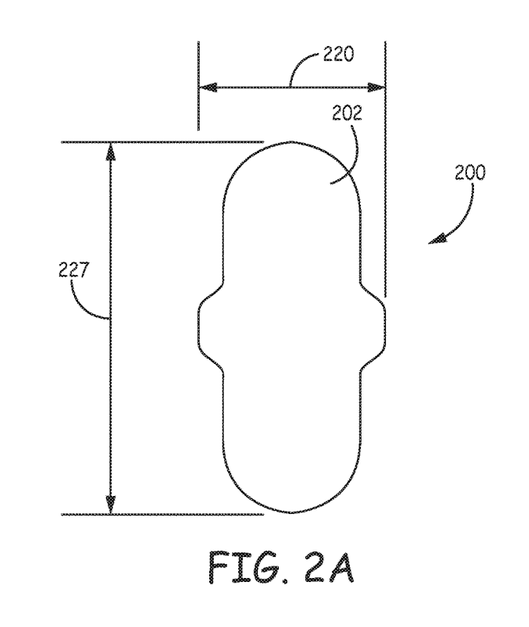
FIG. 2A is a side view of a dome connector of one embodiment of the present invention.
Figure 2B:
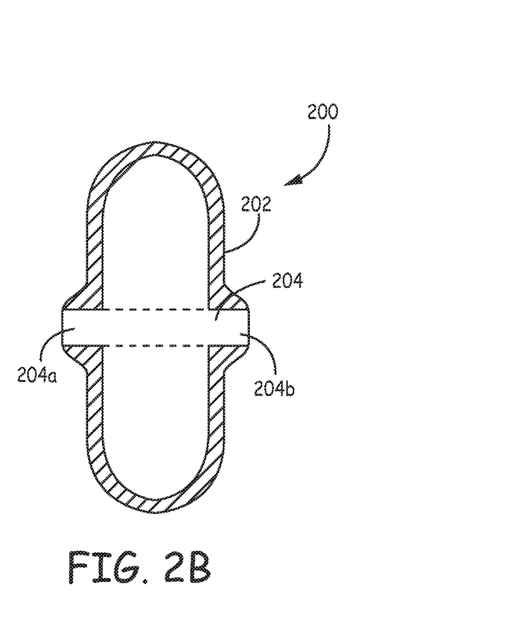
FIG. 2B is a cross-sectional side view of the dome connector of FIG. 2A.
Figure 12:
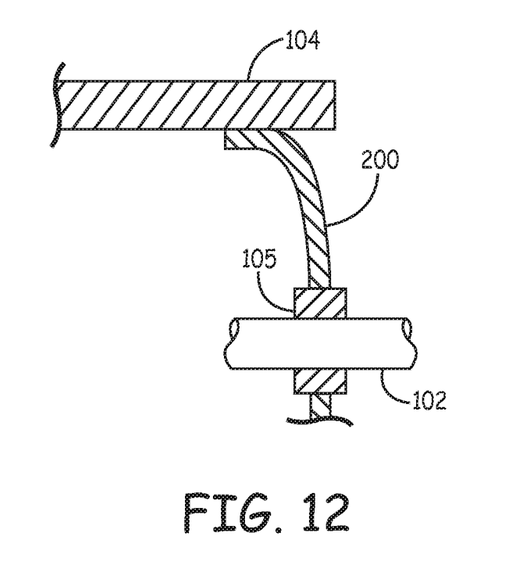
FIG. 12 is a partial side view of a flywheel assembly of one embodiment of the present invention.

Referring to FIG. 1A, a front perspective view of a flywheel assembly 100 of an embodiment that includes a flywheel rim 104, a dome connector 200 and a metal shaft 102 is provided. As illustrated, the flywheel rim 104 is coupled to the shaft 102 via dome connector 200. A cross-sectional side view of the flywheel assembly 100 is further illustrated in FIG. 1B. The dome connector 200 is coupled to the shaft 102 via attachment collars 105a and 105b in this embodiment. The attachment collars 105a and 105b are further discussed below in regard to FIG. 12. An illustration of an embodiment of a dome connector 200 is provided for in a side view of FIG. 2A and the cross-sectional side view of FIG. 2B. This embodiment of the dome connector 200 includes an outer surface 202 that is formed in a desired shape. A central passage 204 passes through the dome connector 200. At the opposed entrances to passage 204 in the dome connector 200 are respective first and second openings 204a and 204b (first port and second port). In some embodiments, the dome connector 200 has a dome length 220 extending along a distance of the central passage 204 and a dome diameter 227 extending a distance perpendicular to the central passage 204. In the embodiments of FIGS. 2A and 2B, the distance of the dome length 220 is less than the distance of the dome diameter 227. In other embodiments, the dome length 220 would be greater than or equal to the distance of the dome diameter 227.

Figure 3:
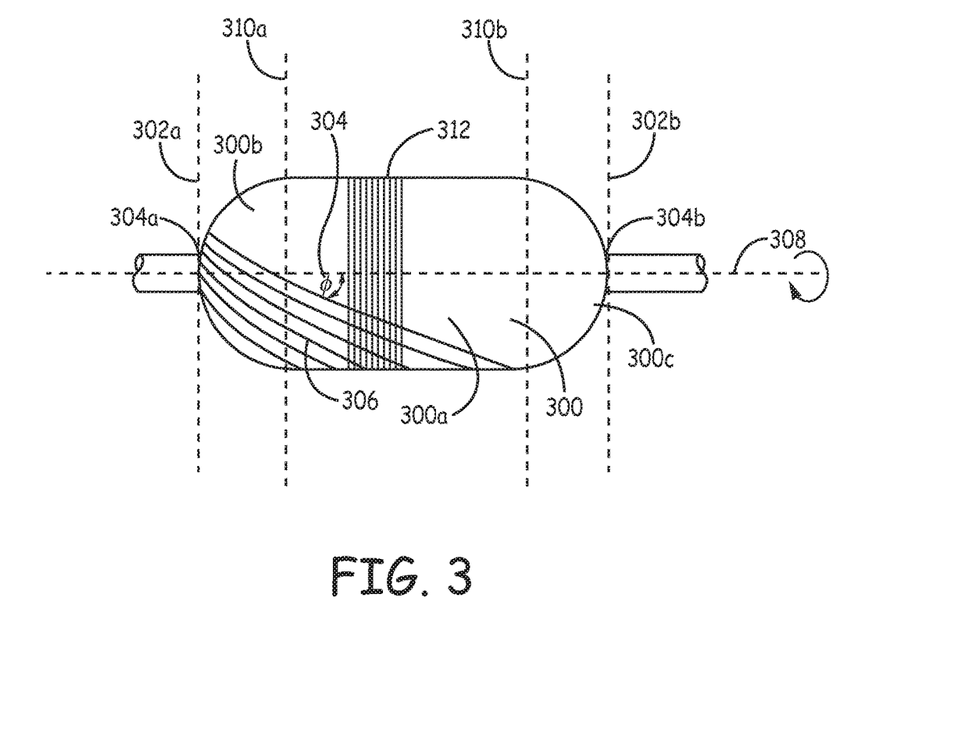
FIG. 3 is a side view illustrating the forming of a dome connector of one embodiment of the present invention.

The formation of a dome connector 200, such as dome connector 200 of FIG. 1A, is discussed in regard to FIG. 3.

FIG. 3 illustrates a tool 300 in which a dome connector is formed in one embodiment. The dome connector 200 is made from a band 306 of toes. Each toe consists of thousands of fibers such as, but not limited to, carbon and heat activated material such as pre-preg material as known in the art. The band 306 is wound around the tool 300 to form the desired dome shape. In particular, in one embodiment the band 306 is positioned by a band dispensing system (not shown), as known in the art, that includes a band dispensing head that selectively positions the band 306 via controller (not shown). The tool 300 is coupled to a portion of the dispensing system that rotates the tool 300 about the tool's center of axis 308 while the band dispensing head is moved axially, in relation to the tool 300, by the controller. Lines 310a and 310b are known as the "tangent" lines of the tool 300 that define a cylindrical portion 300a of the tool 300 from domes 300b and 300c of the tool 300. Between the tangent lines 310a and 310b is called "inboard" and outside the tangent line 310a and 310b is called "outboard." In the embodiment of FIG. 3, overlaying hoop bands 312 are positioned over the cylindrical portion 300a of the tool 300. In one embodiment, the hoop bands 312 are not only applied to the cylindrical portion 300a, but also outboard of at least one of the tangent lines 310a and 310b down to the respective at least one dome 300b and/or 300c of the tool 300.

The embodiment of FIG. 3 depicts the band 306 at a first opening (port) position 302a and then the band 306 is wound around the tool 300 with the dispensing system (not shown) to a second opening (port) position 302b at a select helical angle 304 to form a select helical pattern from one port 304a to the other port 304b in the finished dome connector. FIG. 3 illustrates adjacent band loops having gaps for illustration purposes. In practice, as the band 306 is being laid out on the tool 300 in the helical pattern, there will be no gaps and no overlays (within a layer being formed) that would weaken the dome connector 200. When the band 306 reaches the second port 304b the dispensing head will reverse direction and lay down another helical pattern layer over the first helical pattern layer to the first port 304a. Further helical patterned layers are layered up on the tool 300 to form the dome connector 200. Hence, the dome connector 200 will consist of multi-helical patterned band layers. Specific dome geometries are achieved by winding on tools with different contours. As discussed above, the helical angle 304 is one variable that can be selected to achieve a desired characteristic of the dome connector 200 such as providing a matching deflection (or stiffness) with an associated flywheel rim 104 (FIG. 1A).

Figure 4:
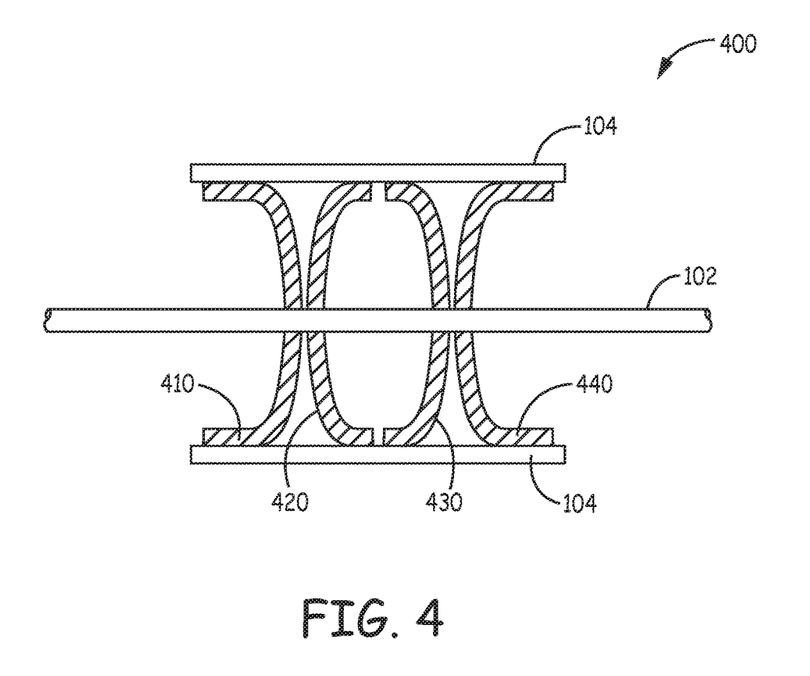
FIG. 4 is a side view of a flywheel assembly with a dome connector configuration of one embodiment of the present invention.

As discussed above, embodiments of the dome connector are effective because they are made with material that has low density but high strength and can be tailored to the stiffness of the flywheel rim 104 (FIG. 1A) by changing any one of the helical angles in the helical pattern, the geometry of the dome and the type of fiber used. Additionally, in domes that use more than one helically wound layer, one or more of the layers may be wound with a pull-back, which is winding the helical to some radius larger than the radius of the ports/collars. Using pull backs can effectively tailor the stiffness and strength of the dome and port regions. Regarding the geometry, by changing the contour of the dome to either relatively shallow or relatively deep, a desired stiffness or deflection can be achieved to match an associated flywheel rim 104. As discussed above, the dome connector can have either convex or concave ends and two or more dome connectors can be used per flywheel rim 104. For example, please refer to FIG. 4 where a flywheel assembly 400 having four dome connectors 410, 420, 430 and 440 is illustrated. The four dome connectors 410, 420, 430 and 440 of the flywheel assembly 400 are positioned next to each other with their respective inner passages aligned. The shaft 102 is mounted within the aligned inner passages of the four dome connectors 410, 420, 430 and 440. The flywheel rim 104 is fitted around the four dome connectors 410, 420, 430 and 440. As discussed above, dome connectors can have ends in different configurations (i.e., convex ends or concave ends) and embodiments are not limited to specific configurations or the number of dome connectors used in a flywheel assembly.

Figure 5A:
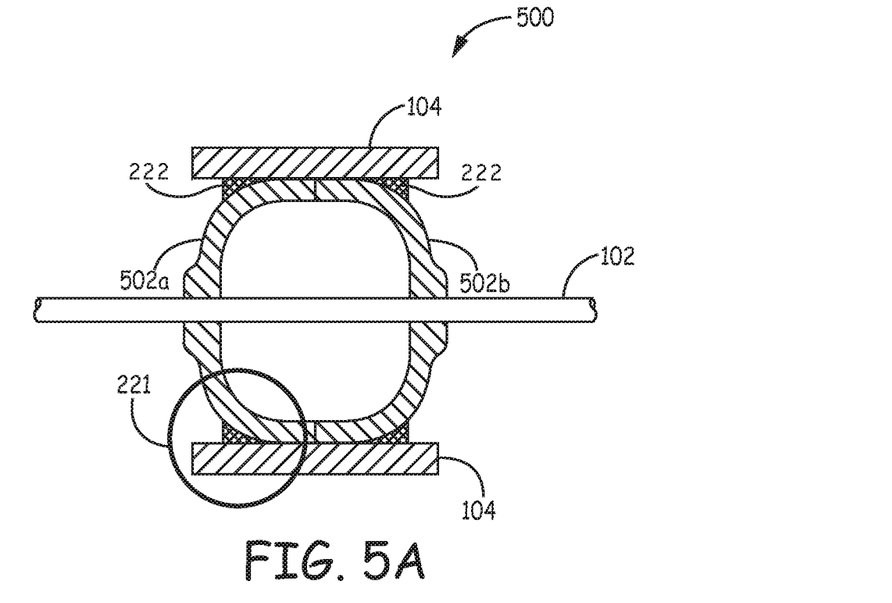
FIG. 5A is a cross-sectional side view of a flywheel assembly of one embodiment of the present invention.
Figure 5B:
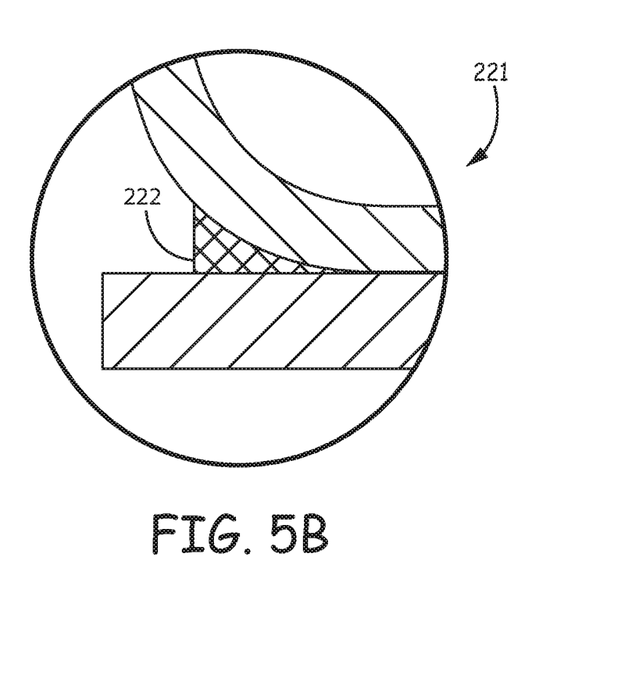
FIG. 5B is a close up view of a portion of the flywheel assembly of FIG. 5A.

FIG. 5A illustrates a cross-sectional side view of a flywheel assembly 500 that includes dome connectors 502*a* and 502*b* of an embodiment. In this embodiment, y-joint connectors 222 are further used to couple the flywheel rim 104 to the dome connectors 502*a* and 502*b*. The y-joint connectors 222 are positioned between the flywheel rim 104 and the respective dome connectors 502*a* and 502*b* where the respective dome begins to curve away from the flywheel rim 104. A close up view 221 of a y-joint connector 222 is illustrated in FIG. 5B. The y-joint connectors 222 can be fabricated from rubber, elastomer, adhesive or other suitable material. The y-joint connectors 222 can be either co-fabricated with the flywheel-dome assembly 500 or after the dome connectors 502*a* and 502*b* are installed in the flywheel rim 104.

Figure 6A:
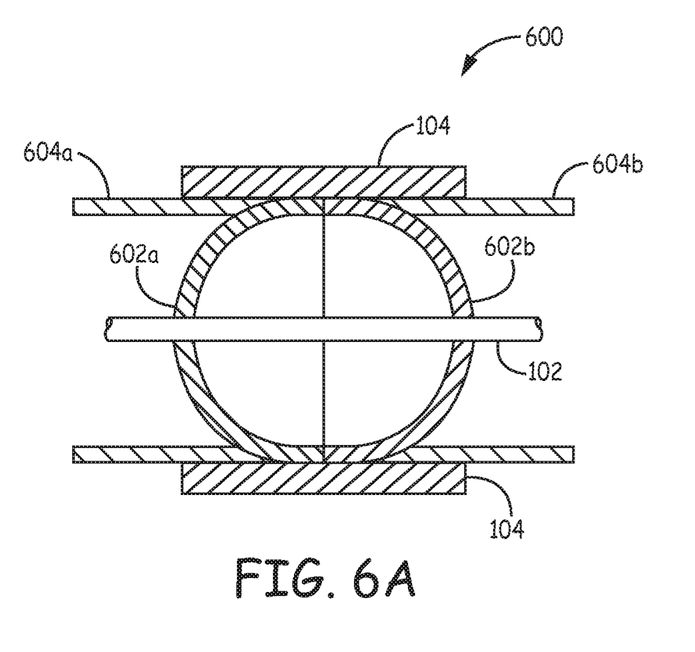
FIG. 6A is a cross-sectional side view of another flywheel assembly being formed of one embodiment of the present invention.
Figure 6B:
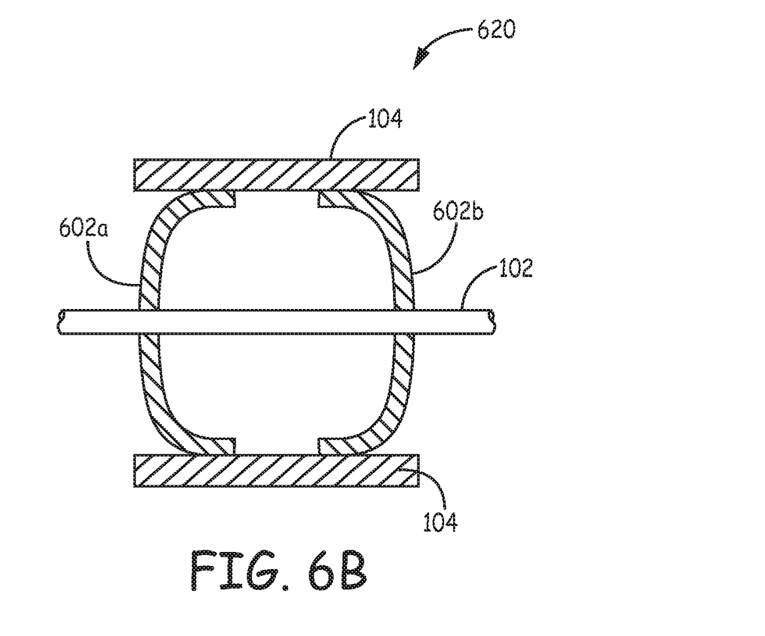
FIG. 6B is a cross-sectional side view of another flywheel assembly of an embodiment of the present invention.

The forming of flywheel assemblies is further discussed below. In one embodiment, a dome connector (such as dome connector 200 of FIG. 2A) is first formed. A center cylindrical portion is then removed from the dome connector. Referring to FIG. 6A, the formation of a flywheel assembly 600 is illustrated. In this cross-sectional side view illustration, a dome connector is first formed and its center cylindrical portion is removed. The dome portions 602*a* and 602*b* of the dome connector are then positioned as illustrated with a shaft 102 extending through central aligned openings of the dome portions 602*a* and 602*b*. Temporary winding mandrels 604*a* and 604*b* are positioned in relation to the dome portions 602*a* and 602*b*. The winding mandrels 604*a* and 604*b* and portion of the dome portions 602*a* and 602*b* create a forming surface in which the flywheel rim 104 is wound around and formed. Once the flywheel rim 104 is formed, the winding mandrels 604*a* and 604*b* are removed. This embodiment allows for flywheels with smaller diameters. FIG. 6B illustrates another way of forming a flywheel assembly. In flywheel assembly 620, the dome portions 602*a* and 602*b* are first cured and then placed and bonded inside of a pre-cured flywheel rim 104.

Figure 7:
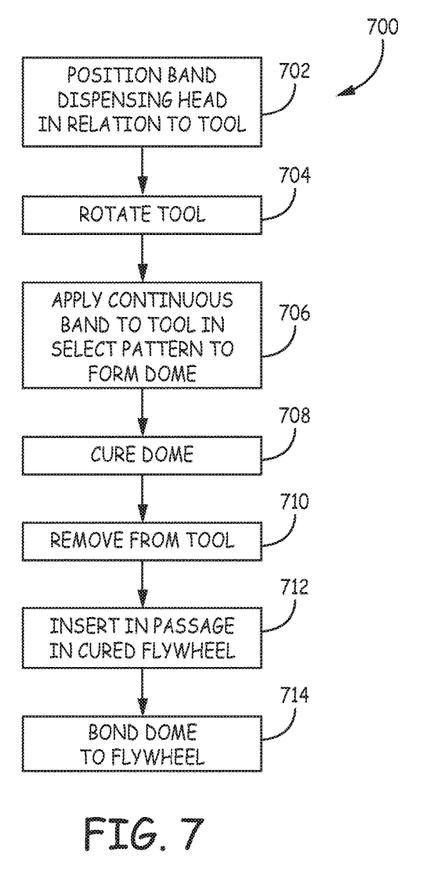
FIG. 7 illustrates a flywheel forming diagram of one embodiment.
Figure 8:
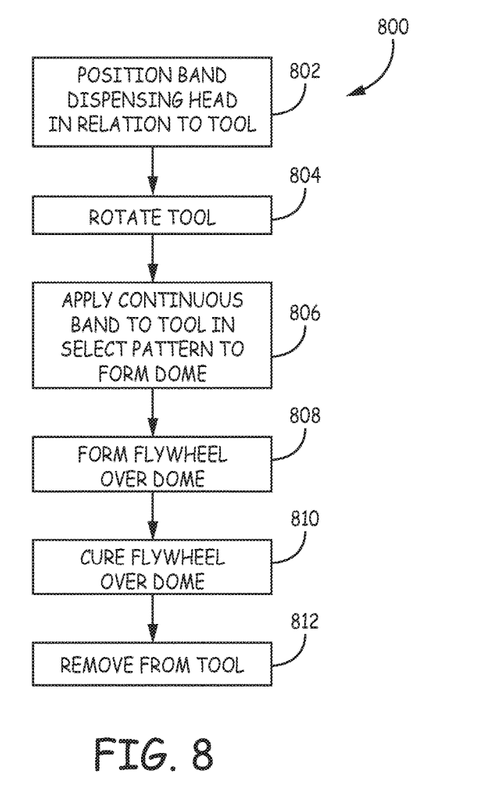
FIG. 8 illustrates a flywheel forming diagram of another embodiment.

A flywheel assembly forming diagram 700 of an embodiment is illustrated in FIG. 7. In this embodiment, the process starts by positioning a band dispensing head in relation to a tool (702). The tool is then rotated (704) and a continuous band is applied to the tool in a select pattern (706). As discussed above, the toe (or band) is laid down from one opening (or port) to the other port in a helical pattern having a select helical angle for at least a portion of the dome connector. Once the entire dome connector has been laid up, it is cured (708). The dome connector is then removed from the tool (710) and in this embodiment is inserted in a central passage in a cured flywheel rim (712) (similar to the discussion in regard to the embodiment of FIG. 6B). The dome connector is bonded with an adhesive within the central passage of the cured flywheel (714). Another embodiment of forming a flywheel assembly is illustrated in the flywheel assembly forming diagram 800 of FIG. 8. In this embodiment, the band or band dispensing head is positioned in relation to the tool (802). Once the dispensing head is in position, the tool is rotated (804). A continuous length of band is then applied on the tool in a select pattern to form the dome connector shape (806). In this embodiment, the flywheel rim is then formed over the dome connector (808) (similar to the discussion in regard to the embodiment of FIG. 6B where the flywheel may be built to extend past the tangent lines of the dome connector). This can be done with the use of the dispensing head or other methods known in the art for forming composite material. The dome connector and the flywheel rim are then cured together therein coupling the dome connector to the flywheel rim (810). In an embodiment, the cured flywheel rim and dome connector are then removed from the tool (812). The dome connector would then be connected to the shaft.

Figure 9:
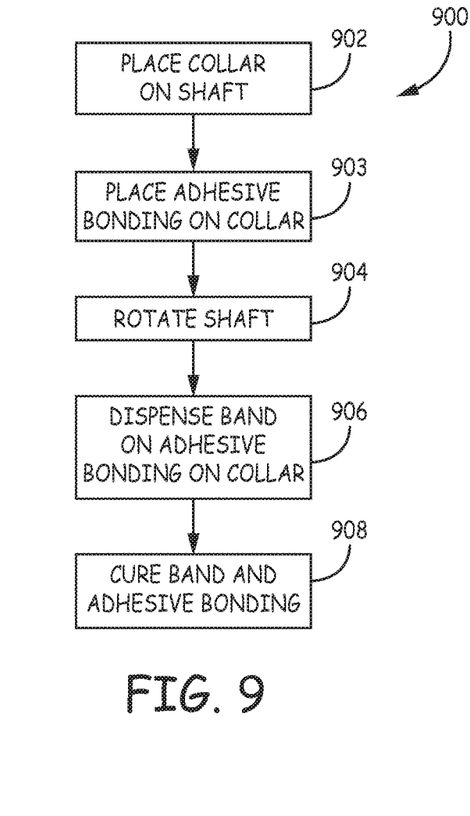
FIG. 9 illustrates a shaft connecting diagram of one embodiment.
Figure 10:
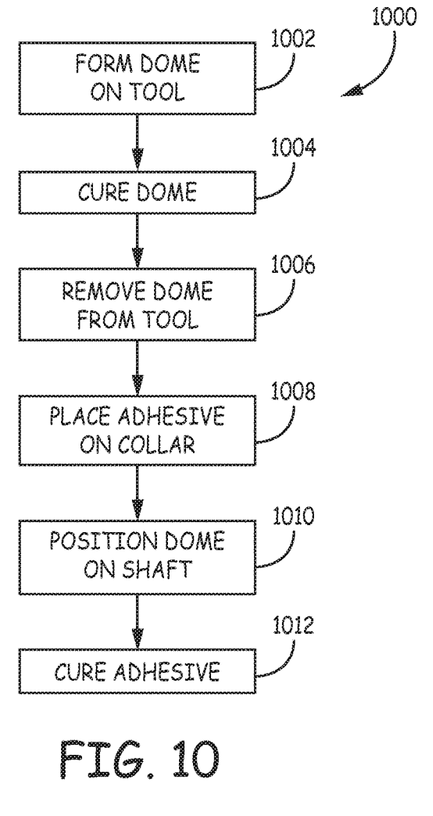
FIG. 10 illustrates a shaft connecting diagram of another embodiment.
Figure 11:
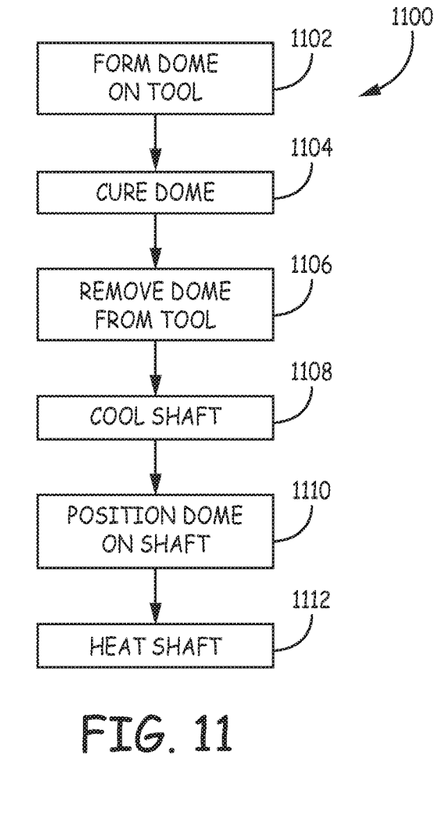
FIG. 11 illustrates a shaft connecting diagram of yet another embodiment.

Connecting the dome connector to the shaft can be done in a number of ways. For example, in the embodiment of the shaft connecting diagram 900 of FIG. 9, the dome is formed on a shaft 102. In particular, in this embodiment, an attachment collar (such as attachment collar 105 of FIG. 12) is first placed on a shaft 102 (902). An adhesive is then placed on the collar 105 (903). The shaft 102 is then rotated (904). The continuous band is then dispensed on the adhesive on the collar in the helical pattern to form the dome connector (906). The dome connector is then cured and the adhesive bonds the dome connector to the collar 105 (908). In another embodiment, illustrated in the shaft connecting diagram 1000 of FIG. 10, the dome connector is formed on the tool as discussed above (1002). The dome connector is then cured (1004). The dome connector is then removed from the tool (1006). An adhesive is placed on the collar (1008). The dome connector is positioned on the shaft (1010). The adhesive is then cured to bond the dome connector to the collar (1012). This collar would then interface with a shaft used for flywheel operation. In embodiments, the adhesive may cure by heat, by drying out and the like. In another example, as illustrated in the shaft connecting diagram (1100) of FIG. 11, the dome connector is formed on the tool as generally described above (1102). The dome connector is then cured (1104). Once cured, the dome connector is removed from the tool (1106). The shaft that the dome connector is to be mounted to is then cooled which will cause it to contract (1108). While the shaft is cooling, the dome connector receives the shaft in its central passage (1110). The shaft is then allowed to heat, which causes the shaft to expand and bond in the central passage of the dome connector (1112). The above provides some example methods of coupling the dome connector to the shaft and the flywheel rim to the dome connector.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is manifestly intended that this invention be limited only by the claims and the equivalents thereof.

What is claimed is:

1. A method of coupling a composite flywheel rim and a shaft, the method comprising:

coupling the shaft to a dome connector comprising at least one band of composite fibers;

coupling the dome connector to the composite flywheel rim;

defining an opening between an inner surface of the composite flywheel rim and an outer portion of the dome connector at an axial end of the dome connector; and disposing at least one connector in the opening, the at least one connector having a wedge shape and comprising a first axial end positioned adjacent to an interface between the composite flywheel rim and the dome connector and a second axial end positioned relatively further away from the interface where the dome connector extends radially away from the composite flywheel rim to define the opening.

2. A method of coupling a composite flywheel rim and a shaft, the method comprising:
  coupling the shaft to a dome connector comprising at least one band of composite fibers;
  coupling the dome connector to the composite flywheel rim,
  defining an opening between an inner surface of the composite flywheel rim and an outer portion of the dome connector at an axial end of the dome connector;
  disposing at least one connector in the opening, the at least one connector having a wedge shape and comprising a first axial end positioned adjacent to an interface between the composite flywheel rim and the dome connector and a second axial end positioned relatively further away from the interface where the composite flywheel rim and the dome connector are spaced apart to define the opening; and
  defining the at least one connector such that the second axial end of the at least one connector exhibits a width that is greater than a width of the first axial end of the at least one connector.

3. The method of claim 1, further comprising inserting the shaft into an opening in a central passage of the dome connector.

4. The method of claim 1, further comprising selecting the at least one connector to be relatively more flexible than the composite flywheel rim and the dome connector.

5. The method of claim 4, further comprising selecting the at least one connector to comprise at least one of a rubber, a elastomer, or an adhesive.

6. The method of claim 1, further comprising positioning the at least one connector at a location where the dome connector begins to curve away from the composite flywheel rim.

7. The method of claim 1, further comprising:
  defining another opening between the inner surface of the composite flywheel rim and the outer portion of the dome connector at another, opposing axial end of the dome connector; and
  disposing another connector in the another opening, the another connector having a wedge shape.

8. The method of claim 1, further comprising defining a convex surface at each outward axial end of the dome connector.

9. The method of claim 1, further comprising defining a concave surface at each outward axial end of the dome connector.

10. The method of claim 2, further comprising positioning the at least one connector at a location where the dome connector begins to curve away from the composite flywheel rim.

11. The method of claim 2, further comprising:
  defining another opening between the inner surface of the composite flywheel rim and the outer portion of the dome connector at another, opposing axial end of the dome connector; and
  disposing another connector in the another opening, the another connector having a wedge shape.

12. The method of claim 2, further comprising defining a convex surface at each outward axial end of the dome connector.

13. The method of claim 2, further comprising defining a concave surface at each outward axial end of the dome connector.

14. The method of claim 1, wherein coupling the dome connector to the composite flywheel rim comprises:
  forming the composite flywheel rim over the dome connector;
  curing the composite flywheel rim and the dome connector simultaneously; and
  after curing the composite flywheel rim and the dome connector simultaneously, disposing the at least one connector in the opening.

15. The method of claim 1, further comprising forming the dome connector comprising:
  laying up a continuous band of composite fibers in a helical pattern from a first port to a second port to form a central passage with a first band layer;
  laying up subsequent layers with the continuous band of composite fibers over at least a portion of the first band layer to form a body of a dome connector; and
  curing the continuous band of composite fibers to form the dome connector.

16. The method of claim 1, further comprising:
  bonding an attaching collar within a central passage of the dome connector; and
  bonding the dome connector within a central passage of the composite flywheel rim.

17. The method of claim 16, wherein bonding the dome connector within the central passage of the composite flywheel rim further comprises:
  forming the composite flywheel rim over the dome connector; and
  curing the composite flywheel rim and the dome connector simultaneously.

18. The method of claim 17, wherein bonding the dome connector within the central passage of the composite flywheel rim further comprises applying an adhesive between the dome connector and the central passage of the composite flywheel rim.

19. The method of claim 1, wherein coupling the shaft to the dome connector comprises:
  cooling the shaft;
  placing the shaft in a central passage of the dome connector; and
  heating up the shaft.

20. A method of coupling a composite flywheel rim and a shaft, the method comprising:
  coupling the shaft to a dome connector comprising composite fibers;
  coupling the dome connector to the composite flywheel rim;
  defining an opening between an inner surface of the composite flywheel rim and an outer portion of the dome connector at an axial end of the dome connector; and
  disposing at least one connector in the opening, the at least one connector having a wedge shape and comprising a first axial end positioned adjacent to an interface between the composite flywheel rim and the dome connector and a second axial end positioned relatively further away from the interface where the composite flywheel rim and the dome connector are separated by the opening, the opening having a radial dimension that is greater than a radial dimension of the interface.

\* \* \* \* \*

UNITED STATES PATENT AND TRADEMARK OFFICE
CERTIFICATE OF CORRECTION

PATENT NO.      : 10,400,855 B2
APPLICATION NO. : 15/261337
DATED           : September 3, 2019
INVENTOR(S)     : Brian R. Christensen and Marcus A. Darais Page 1 of 1

It is certified that error appears in the above-identified patent and that said Letters Patent is hereby corrected as shown below:

In the Specification
Column 1,    Line 9, change "2016 the disclosure" to --2016, the disclosure--

Signed and Sealed this
Twenty-second Day of October, 2019

Andrei Iancu
*Director of the United States Patent and Trademark Office*